United States Patent
Miyadera

[11] Patent Number: 5,315,396
[45] Date of Patent: May 24, 1994

[54] DROPOUT COMPENSATION DEVICE

[75] Inventor: Shunichi Miyadera, Tokyo, Japan

[73] Assignee: Asahi Kogaku Kogyo Kabushiki Kaisha, Tokyo, Japan

[21] Appl. No.: 656,324

[22] Filed: Feb. 19, 1991

[30] Foreign Application Priority Data

Feb. 22, 1990 [JP] Japan ................. 2-42189

[51] Int. Cl.5 ............... H04N 5/70; H04N 5/76
[52] U.S. Cl. .................. 348/792; 358/336; 345/90; 345/98; 345/117; 348/616
[58] Field of Search ............ 358/336, 340, 314, 36, 358/37, 166, 167, 153, 1155, 213.12, 213.15, 213.17, 241; 360/38.1; 340/784; 345/90, 98, 95, 117, 210; H04N 5/70, 5/76

[56] References Cited
U.S. PATENT DOCUMENTS

| | | | |
|---|---|---|---|
| 4,525,710 | 6/1985 | Hoshio et al. | 340/784 |
| 4,701,796 | 10/1987 | Kamiya | 358/153 |
| 4,864,426 | 9/1989 | Gotoh | 358/336 |
| 4,872,066 | 10/1989 | Yamagata et al. | 358/336 |
| 4,893,192 | 1/1990 | Takemura | 358/336 |
| 4,977,461 | 11/1990 | Ichimura | 358/314 |
| 5,095,304 | 3/1992 | Young | 340/784 |

Primary Examiner—Tommy P. Chin
Assistant Examiner—Khoi Truong
Attorney, Agent, or Firm—Sughrue, Mion, Zinn, Macpeak & Seas

[57] ABSTRACT

A dropout compensation device includes a plurality of video signal storage devices, e.g., capacitors, for storing video signals to be displayed, a dropout detection circuit for detecting video signal dropout, and a circuit for interrupting the supply of video signals to the storage circuits whenever a dropout is detected, with the display continuing in accordance with what is already stored, e.g., from the previous line of video before the dropout was detected.

5 Claims, 4 Drawing Sheets

DROPOUT COMPENSATION DEVICE

BACKGROUND OF THE INVENTION

This invention relates to a dropout compensation device suitable for use in recording/reproducing apparatus such as VTRs or still video cameras with an integral monitor.

DESCRIPTION OF THE RELATED ART

A conventional recording/reproducing apparatus such as a VTR with an integral monitor may include a dropout compensation circuit.

The dropout compensation circuit compensates for signal dropout by inserting an RF luminance signal, which is FM-modulated, of 1H (one horizontal scanning) previously when the dropout is detected, and is constructed as shown in FIG. 5. The RF luminance signal is applied not only to one of the contacts of a changeover switch 135 but also to both a 1H delay line 133, e.g., a glass delay line, and a dropout detector 134. The 1H delay line 133 subjects the RF luminance signal to a delay of 1H and applies the delayed RF luminance signal to the other contact of the changeover switch 135. Thus, the 1H-delayed RF luminance signal always appears at the output of the 1H delay line 133. The dropout detector 134 monitors the RF luminance signal, sets the changeover switch 135 to the 1H delay line 133 side upon detecting a dropout in the RF luminance signal, and outputs a 1H-delayed luminance signal, while it sets the changeover switch 135 to the other contact if no dropout has been detected and outputs the undelayed RF luminance signal.

Conventional dropout compensation arrangements of the type described above suffer from problems of size and cost since delay lines are relatively bulky and expensive. Further, dropout compensation using the delay lines is usually applied only to luminance signals, not to color signals, for reasons of performance and cost of the delay lines.

SUMMARY OF THE INVENTION

The present invention has been made in view of the above circumstances. Accordingly, an object of the invention is to provide a display element drive device capable of performing dropout compensation not only for luminance signals but also for color signals, without using delay lines.

To achieve the above object, the invention provides a dropout compensation device which comprises: display means having a plurality of storage portions for storing video signals, a plurality of display elements for displaying the video signals stored in the storage portions, and a plurality of switching elements for supplying the video signals to be displayed to the storage portions; a first driver for supplying the video signals to the storage portions through the switching elements; a second driver for controlling the switching elements to turn on and off by generating a scanning pulse; and dropout detection means for detecting a dropout of a video signal. When the dropout detection means has detected a dropout of a video signal, the second driver controls the switching elements so that the operation of supplying the video signals to the storage portions is suspended.

The dropout compensation device suspends the supply of the video signals to the capacitors by causing the second driver to control the switching elements while a dropout is being detected by the dropout detection means. As a result, the video signals stored on the storage portions are not updated, so that video signals of one field before continue to be displayed. Since the storage portions store, e.g., R, G, B video signals, not only the luminance signal component but also the color signal component can be subjected to a dropout compensation process.

The present disclosure relates to the subject matter contained in Japanese Patent Application No. Hei. 2-42189 (filed on Feb. 22, 1990) which is expressly incorporated herein by reference in its entirety.

BRIEF DESCRIPTION OF THE DRAWINGS

The invention will be more clearly understood from the following description with reference to the accompanying drawings, wherein.

DETAILED DESCRIPTION OF THE PREFERRED EMBODIMENT

Figure 1:
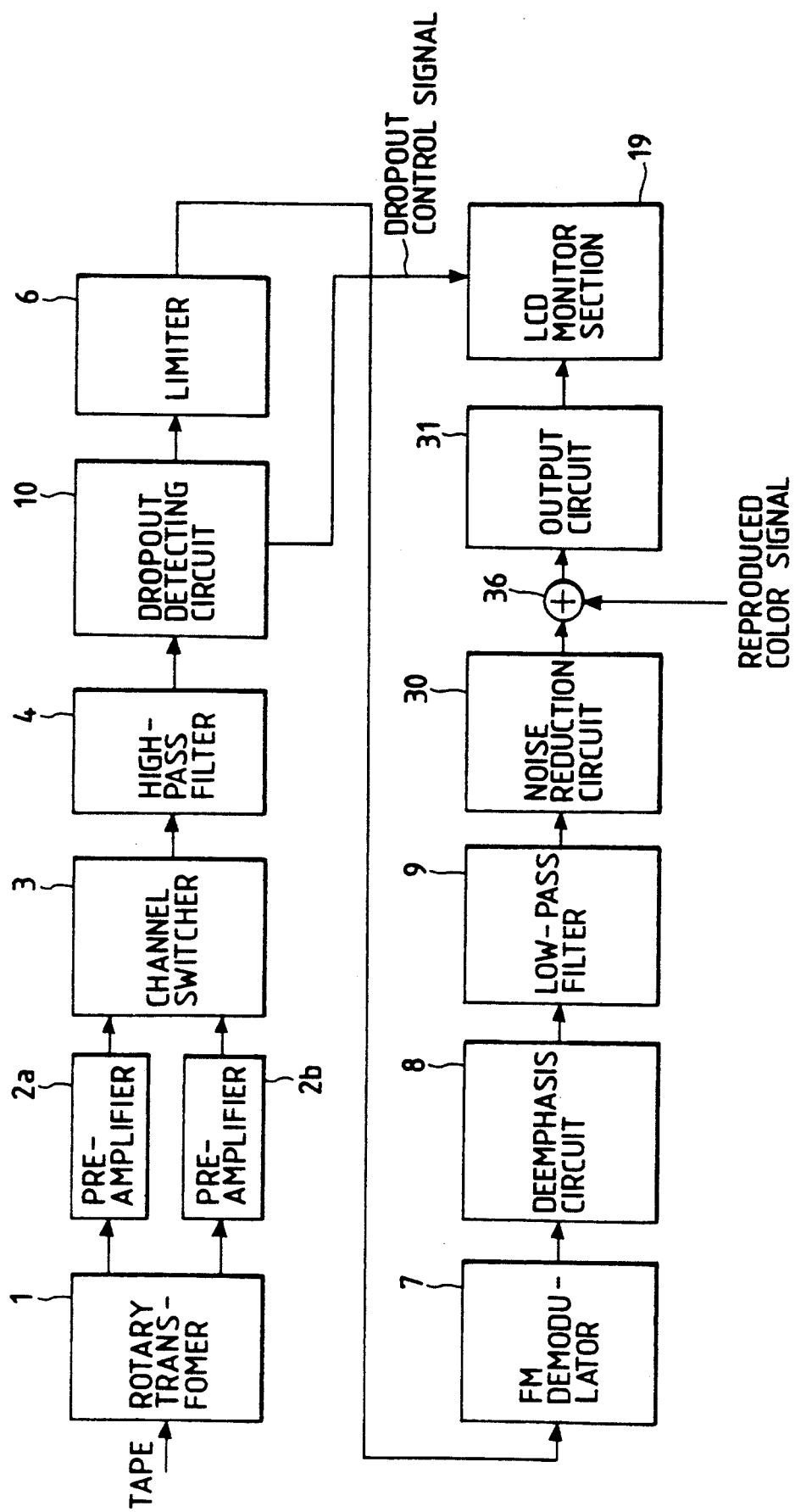
FIG. 1 is a block diagram showing the construction of a display element drive d vice according to a preferred embodiment of the invention.
Figure 2:
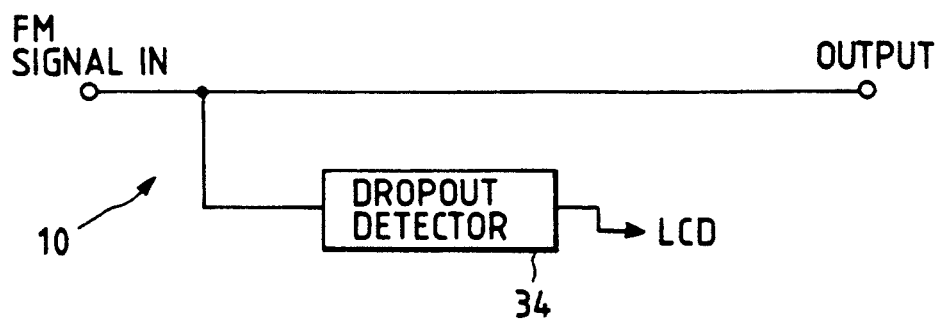
FIG. 2 is a block diagram showing an example of the construction of a dropout compensation circuit of the display element drive device shown in FIG. 1.

FIGS. 1 and 2 are block diagrams respectively showing a display element drive device according to a preferred embodiment of the invention.

Figure 5:
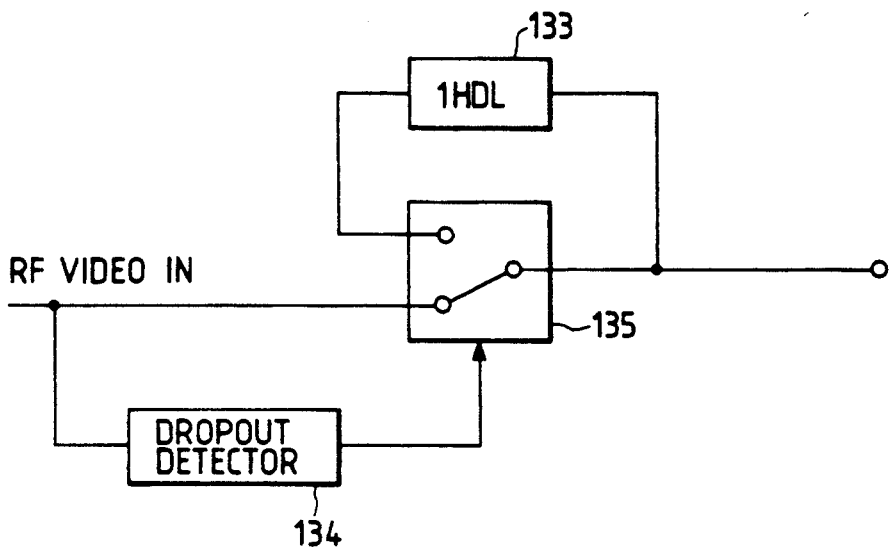
FIG. 5 is a block diagram showing an example of the construction of a conventional compensation circuit.

In FIG. 1, a reproduced signal from a recording medium, for example a tape (not shown), is supplied to pre-amplifiers 2a and 2b through two heads (not shown) formed on a rotary transformer 1. The pre-amplifiers 2a, 2b amplify video signals, and supply them to a channel switcher 3. The channel switcher 3 switches the pre-amplifier 2a, 2b outputs at a predetermined timing to continuously reproduce an RF video signal. A high-pass filter 4 separates an RF luminance signal which is FM-modulated from this RF reproduced video signal. The RF luminance signal supplied from the high-pass filter 4 is also directly applied to the limiter 6 and to the dropout detector 34. The RF luminance signal supplied to the limiter 6 is supplied to an FM demodulator 7 to be demodulated into a video signal. Then the demodulated luminance signal is subjected to a de-emphasis process at a de-emphasis circuit 8 and to a noise removal process at both a low-pass filter 9 and a noise reduction circuit 30. Thereafter the luminance signal thus processed is added to reproduced chrominance signals (from a circuit not shown ) at an adder 36. An output circuit 31 outputs both the reproduced luminance signal and the reproduced chrominance signals as a summing signal handled at the adder 36 expressing a video composite signal of NTSC (National Television System Committee), to an LCD (liquid crystal display) monitor section 32. On the other hand, the dropout detecting circuit 10 is constructed as shown in FIG. 2. No 1H (one horizontal scanning) delay line 33 and changeover switch 35 such as shown in FIG. 5 are used, and the output of the dropout detector 34 is simply applied to the LCD monitor section 19, which will be described next.

Figure 4:
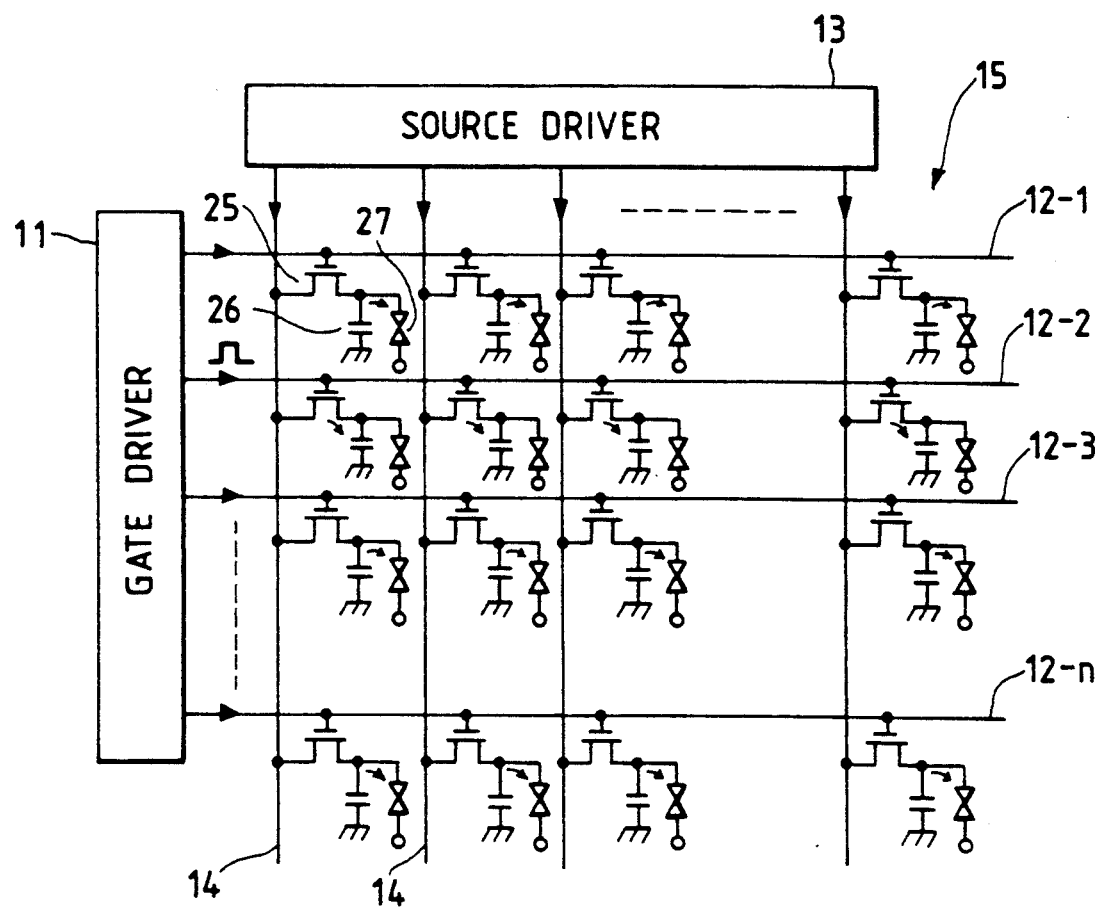
FIG. 4 is a block diagram showing an example of the construction of the LCD of the display element drive device shown in FIG. 1.
Figure 3:
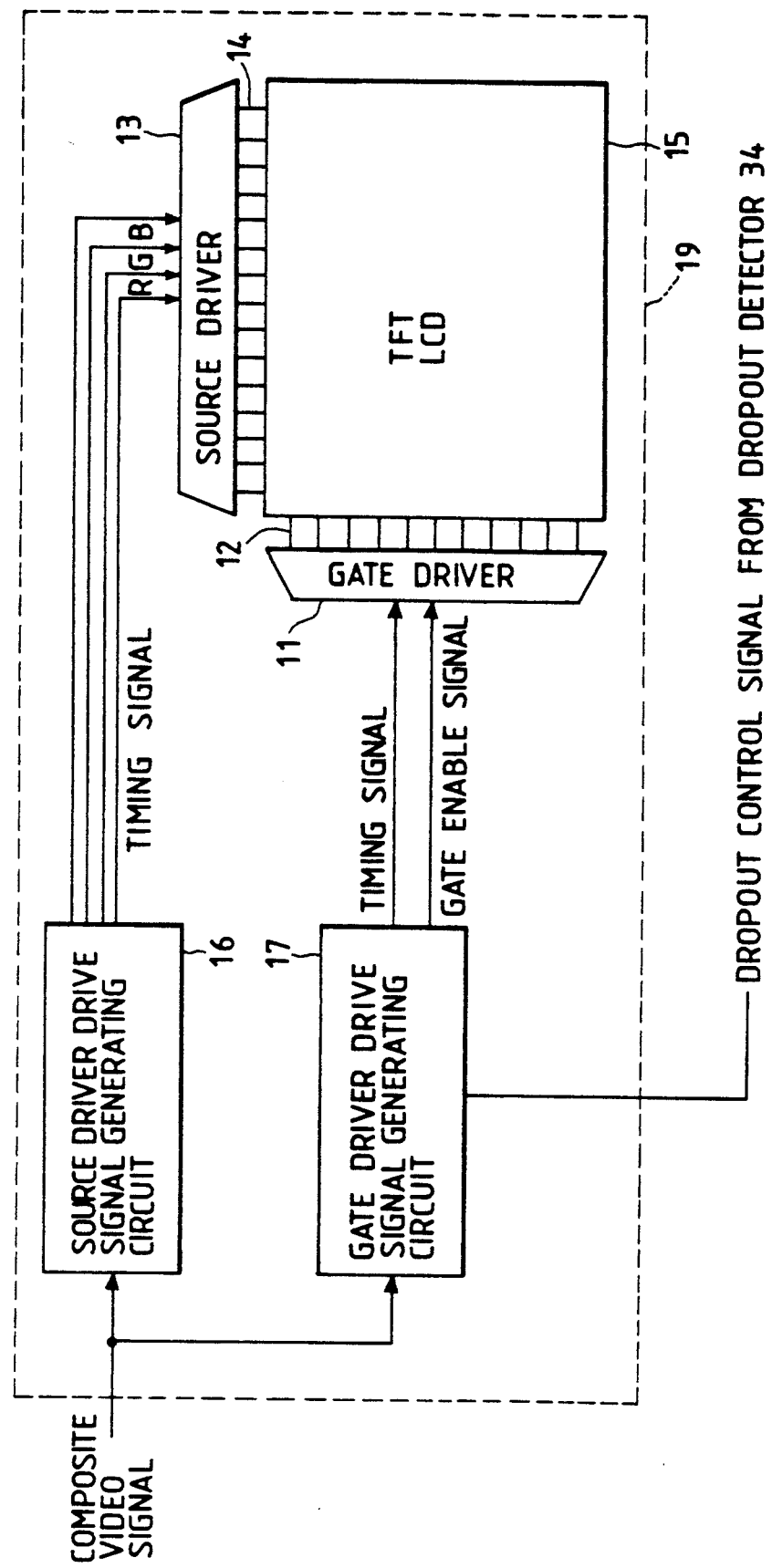
FIG. 3 is a block diagram showing an example of the construction of an LCD monitor section of the display element drive device shown in FIG. 1.

The LCD monitor section 19 is constructed as shown in FIG. 3, and a TFT (thin film transistor) LCD 15 in the LCD monitor section 19 is constructed as shown in FIG. 4.

In FIG. 3, a composite video signal, which is outputted from the output circuit 31, is applied to a source driver drive signal generating circuit 16 and a gate driver drive signal generating circuit 17. The source driver drive signal generating circuit 16 generates primary color signals (R, G, B signals) in view of the input video signal and also generates timing signal in accordance with horizontal and vertical synchronizing signals which are incorporated into the input video signal, and outputs the primary color signals and the timing signal to a source driver 13, respectively. The source driver 13 outputs primary color signal of one horizontal scanning in accordance with these signals described above to the source of each of TFTs 25 (see FIG. 4) of the TFT LCD 15 at a predetermined timing.

The gate driver drive signal generating circuit 17 generates a timing signal in view of a gate enable signal and the horizontal and vertical synchronizing signals that is incorporated into the input video signal, and outputs the gate enable signal and the timing signal to the gate driver 11, respectively.

In the case where the gate enable signal exists, the gate driver 11 outputs a scanning pulse to each of gate buses 12-1, 12-2, 12-3 . . . 12-n in accordance with the timing signal in turn. Therefore, when the scanning pulse is supplied to one of the gate buses, the TFT connected to the gate bus which received the scanning pulse is "ON" and the primary color signals supplied from each of the source buses are stored on the capacitors 26, respectively, to display the image of one horizontal scanning by the LCD elements. As a result, this operation is continuously performed to display the image corresponding to the video signal.

After the TFTs 25 have been turned off, the video signals stored at the capacitors 26 continue to be outputted to the display elements 27 to continue the display of the picture corresponding to what is stored on the capacitors.

The gate driver drive signal generating circuit 17 of the LCD monitor section 19 receives a dropout control signal from the dropout detector 34 of the dropout detecting circuit 10. The dropout control signal is supplied to the gate driver signal generating circuit 17 when a dropout has been detected in a luminance signal. The gate driver drive signal serves to suspend the operation of outputting the gate enable signal during a period in which the dropout control signal is inputted. As a result, the gate driver 11 operates forcibly so that no scanning pulse will be applied during a period in which the dropout is detected. As a result, the primary color signals stored on the capacitors 26 remain as is and are not updated during this period, and the display elements 27 display the primary color signals of one field before as stored on the capacitors 26.

Figure 6:
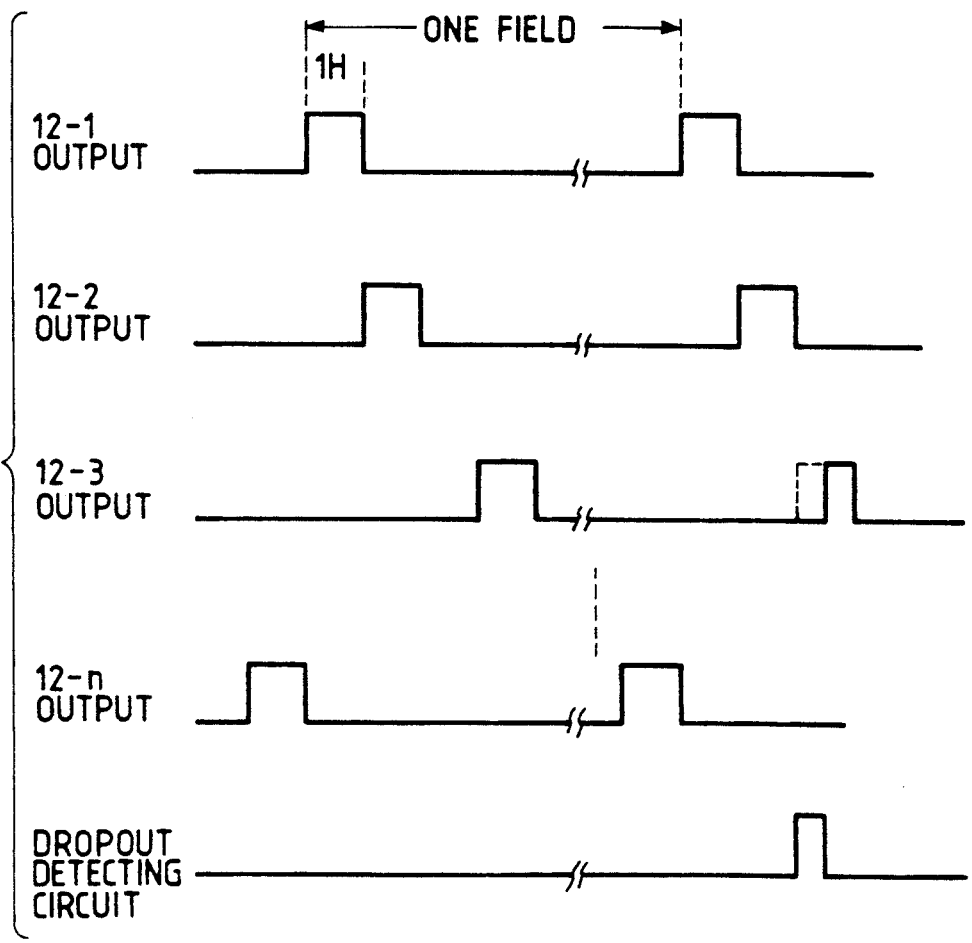
FIG. 6 is a timing chart showing an example of the function of the various portions of FIG. 4.

More specifically, the timing chart of these operation described above is as shown in FIG. 6. When the dropout detecting circuit 10 detects the dropout incorporated into the TV signal, the pulse is not supplied to the gate bus (in this case, 12-3) of the display portion corresponding to the video signal during the period. Therefore, the primary color signals stored on the capacitors 26 remain as is and are not updated during this period, and the display elements 27 display the primary color signals of one field before as stored on the capacitors 26.

Thus, the dropout compensation is performed by not updating the video signals stored at the capacitors 26 while the dropout is being detected and therefore continuing to display the video signals of one field before. The use of the video signals of one field before which are stored on the capacitors 26 not only dispenses with the conventional 1H delay line 33 shown in FIG. 5, but also allows the dropout compensation signal to incorporate color components since this information is stored on the capacitors 26.

It will be appreciated that various changes and modifications may be made to the embodiment disclosed above without departing from the spirit and scope of the invention as defined in the appended claims. For example, while the above embodiment employs two separate elements: the capacitor 26 and the display element 27, the use of a liquid crystal display element as a display element 27 may dispense with the capacitor 26 because the liquid crystal display element incorporates a capacitor component.

As described in the foregoing, the display element drive device of the invention suspends the supply of the video signals stored on the capacitors by controlling the switching elements while a dropout is being detected by the dropout detection means, to thereby leave the video signals at the capacitors as is without updating them, thereby permitting dropout compensation to be performed with the video signals of a predetermined field before.

In addition, since the video signals are used as stored on the capacitors without subjecting them to any processing, there will be no case where some color is missing from the image reproduced by the compensated video signals.

I claim:

1. A dropout compensation device, comprising:
   display means having a plurality of capacitors for storing video signals, a plurality of display elements for displaying respective image portions in accordance with the video signals stored in said capacitors, and a plurality of switching elements for supplying to said capacitors video signals representing an image to be displayed;
   a first driver for supplying said video signals to said switching elements to be supplied to said capacitors;
   a second driver for generating scanning pulses for turning said switching elements on and off; and
   dropout detection means for detecting a dropout of said video signal;
   said second driver being responsive to detection of a dropout by said dropout detection means for controlling said switching elements to interrupt the supplying of said video signals to said capacitors so that during a dropout said capacitors continue to store video signals provided to said capacitors prior to said dropout, and said display elements continue to display image portions in accordance with the previously stored video signals.

2. A dropout compensation device according to claim 1, wherein said display elements are liquid crystal display elements and said liquid crystal display elements incorporate said capacitors.

3. A dropout compensation device, comprising
display means having a plurality of storage portions for storing video signals, a plurality of display elements for displaying respective image portions in accordance with the video signals stored in said storage portions, and signal supply means for supplying to said storage portions video signals representing an image to be displayed;
dropout detection means for detecting a dropout of said video signal; and
means responsive to an output from said dropout detection means for disabling said signal supply means during the presence of signal dropout so that during a dropout said storage portions continue to store video signals provided to said storage portions prior to said dropout, and said display elements continue to display image portions in accordance with the previously stored video signals.

4. A dropout compensation device according to claim 3, wherein said storage portions are a plurality of capacitors.

5. A dropout compensation device according to claim 4, wherein said display elements are liquid crystal display elements and said liquid crystal display elements incorporate said capacitors.

* * * * *